United States Patent
Kuno

(10) Patent No.: US 9,489,571 B2
(45) Date of Patent: Nov. 8, 2016

(54) DISPLAY CONTROL DEVICE, RECORDING MEDIUM AND DISPLAY DEVICE CONTROL METHOD

(75) Inventor: Michiaki Kuno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 14/400,927

(22) PCT Filed: Sep. 3, 2012

(86) PCT No.: PCT/JP2012/072394
§ 371 (c)(1),
(2), (4) Date: Nov. 13, 2014

(87) PCT Pub. No.: WO2013/171919
PCT Pub. Date: Nov. 21, 2013

(65) Prior Publication Data
US 2015/0139550 A1    May 21, 2015

(30) Foreign Application Priority Data
May 17, 2012  (JP) .............................. 2012-113832

(51) Int. Cl.
*G06F 3/0488* (2013.01)
*G06K 9/00* (2006.01)
*G06K 9/03* (2006.01)

(52) U.S. Cl.
CPC ....... *G06K 9/00402* (2013.01); *G06F 3/04883* (2013.01); *G06K 9/00422* (2013.01); *G06K 9/03* (2013.01); *G06K 2209/011* (2013.01)

(58) Field of Classification Search
None
See application file for complete search history.

(56) References Cited

U.S. PATENT DOCUMENTS

| 6,775,238 | B1 * | 8/2004 | Suzuki | H04L 12/2602 340/3.1 |
| 2006/0265648 | A1 * | 11/2006 | Rainisto | G06F 3/0237 715/259 |
| 2008/0150910 | A1 | 6/2008 | Nakajima | |
| 2012/0290291 | A1 * | 11/2012 | Shelley | G06F 3/018 704/9 |

FOREIGN PATENT DOCUMENTS

| JP | 6-187486 A | 7/1994 |
| JP | 6-236359 A | 8/1994 |

(Continued)

OTHER PUBLICATIONS

"Method for Presenting Recognition Results in Online Handwritten Character Recognition", IBM Technical Disclosure Bulletin, International Business Machines Corp. (Thornwood), US, vol. 35, No. 1A, Jun. 1, 1992, p. 18, XP000308747, ISSN: 0018-8689.
Han Honso, "Handwriting recognition for Android.", Apr. 17, 2010, p. 1, XP054976427, Retrieved from the Internet: URL:https//www.youtube.com/watch?v=bCXwfVOYEzA&list=PL4672933E9445597E&Index=1 (retrieved on Mar. 17, 2016).

(Continued)

*Primary Examiner* — Viet Pham
*Assistant Examiner* — Christopher Kohlman
(74) *Attorney, Agent, or Firm* — Birch, Stewart, Kolasch & Birch, LLP

(57) ABSTRACT

The inputted character candidate display section (1213)/inputted character string candidate display section (1214) cause candidates of a character/character string, which is predicted as an intended character/character string to be inputted by the user, to be displayed as inputted character candidates/inputted character string candidate, and the converted character string candidate display section (1215) causes converted character string candidates, which have been obtained by converting the inputted character string candidate, to be displayed.

5 Claims, 13 Drawing Sheets

(56) References Cited

FOREIGN PATENT DOCUMENTS

| JP | 6-314276 A | 11/1994 |
| JP | 9-034890 A | 2/1997 |
| JP | 9-069095 A | 3/1997 |
| JP | 10-105645 A | 4/1998 |
| JP | 2000-003242 A | 1/2000 |
| JP | 2003-242446 A | 8/2003 |
| KR | 2001-0015069 A | 2/2001 |
| KR | 10-2008-0059505 A | 6/2008 |

OTHER PUBLICATIONS

Toyokawa, et al., "An Approach to Integrated Pen Interface for Japanese Text Entry", 2334D IEICE Transactions on Information and Systems, Information & Systems Society, Tokyo, JP, vol. E77-D, No. 7, Jul. 1, 1994, pp. 817-824, XP000445295, ISSN: 0916-8532.

* cited by examiner

DISPLAY CONTROL DEVICE, RECORDING MEDIUM AND DISPLAY DEVICE CONTROL METHOD

TECHNICAL FIELD

The present invention relates to a display control device, an electronic apparatus, a control program, and a method for controlling a display device, and particularly relates to a display control device for controlling a display device which includes a touch panel with which handwritten characters can be inputted through touch on the touch panel.

BACKGROUND ART

In recent years, an electronic apparatus has been commercially available that includes a touch panel, with which handwritten characters can be inputted through touch, so that a user can input characters by handwriting.

The electronic apparatus includes a display control device for (i) recognizing a character which the user has inputted by handwriting and (ii) displaying a character obtained as a result of the character recognition.

When the display control device carries out character recognition of a handwritten character, a plurality of candidates can be obtained which are predicted as candidates for the handwritten character.

As one of display control devices, a direct input type display control device has conventionally existed which determines by itself a candidate, which is to be displayed as an inputted character, from among a plurality of candidates (inputted character candidates) obtained as a result of character recognition.

For example, Patent Literature 1 discloses a character recognizing device which, when a user has inputted a handwritten character in a character input frame, (i) matches input data of the handwritten character with a character pattern contained in a recognition dictionary and (ii) displays a recognition candidate whose recognition distance is the shortest.

Moreover, each of Patent Literatures 2 through 4 discloses a direct input type display control device which displays one candidate determined by the display control device itself from among character candidates obtained as a result of character recognition.

However, an inputted character candidate which has been determined and is displayed by the direct input type display control device has sometimes not been accurately recognized. Therefore, the direct input type display control device disclosed in each of Patent Literatures 1 through 5 may possibly display a character obtained as a result of inaccurate recognition.

In view of this, an input selection type display control device has been developed in which a user selects a correct inputted character candidate from among inputted character candidates obtained as a result of character recognition.

For example, Patent Literature 6 discloses a display device which displays, in a recognition candidate display area, a plurality of candidate characters which have been obtained (i.e., which have not been specified to one) as a result of a process of recognizing a handwritten character inputted in a handwriting input area. The user selects a candidate character by touching any of the candidate characters displayed in the recognition candidate display area.

However, the display device disclosed in Patent Literature 6 has a problem as follows: that is, the display device itself judges whether or not the recognition results can be specified to one, i.e., whether or not the recognition results are accurate, and therefore, if the judgment is incorrect, the display device is to display a character obtained as a result of the inaccurate recognition.

As another input selection type display control device, Patent Literature 7 discloses an input device which displays recognition candidates in a recognition candidate display frame when a user has touched an inaccurately recognized character which is displayed in a recognition result display area as a result of inaccurate character recognition. According to Patent Literature 7, the user selects a correct recognition candidate from among the recognition candidates, and it is therefore possible to correct the inaccurately recognized character.

CITATION LIST

Patent Literature

[Patent Literature 1]
Japanese Patent Application Publication Tokukaihei No. 10-105645 (Publication date: Apr. 24, 1998)
[Patent Literature 2]
Japanese Patent Application Publication Tokukaihei No. 9-34890 (Publication date: Feb. 7, 1997)
[Patent Literature 3]
Japanese Patent Application Publication Tokukaihei No. 6-314276 (Publication date: Nov. 8, 1994)
[Patent Literature 4]
Japanese Patent Application Publication Tokukaihei No. 6-236359 (Publication date: Aug. 23, 1994)
[Patent Literature 5]
Japanese Patent Application Publication Tokukaihei No. 9-69095 (Publication date: Mar. 11, 1997)
[Patent Literature 6]
Japanese Patent Application Publication Tokukai No. 2000-3242 (Publication date: Jan. 7, 2000)
[Patent Literature 7]
Japanese Patent Application Publication Tokukaihei No. 6-187486 (Publication date: Jul. 8, 1994)

SUMMARY OF INVENTION

Technical Problem

However, according to the input device disclosed in Patent Literature 7, the user needs to carry out an operation of touching the inaccurately recognized character in order to confirm whether or not an accurate recognition result is selected. Therefore, the input device which requires such an extra operation causes a problem that the user cannot input characters smoothly.

Further, Patent Literature 7 discloses that the input device automatically carries out a kana-kanji conversion process on the recognition result. Therefore, the input device has a problem that the input device may carry out kana-kanji conversion, which is not wanted by the user, on characters inputted by the user.

The present invention is accomplished in view of the problems, and its object is to provide a display control device and the like (i) in which inputted character candidates prepared from a recognized handwritten characters, an inputted character string candidate, and converted character string candidates are displayed so that a user can select an intended converted character string candidate from among the converted character string candidates, and (ii) with which the user can immediately confirm, by casting a glance at the inputted character candidates and the inputted character string candidate, whether or not the converted character string candidates have been obtained by converting properly predicted character string candidates.

Solution to Problem

In order to attain the object, a display control device of the present invention includes:
(1) an inputted character candidate display section configured to carry out a process of (i) recognizing a handwritten character inputted by a user through touch on a screen and (ii) causing candidates of a character, which is predicted as an intended character to be inputted by the user, to be displayed on the screen as inputted character candidates;
(2) an inputted character string candidate display section configured to carry out a process of causing a candidate of a character string, which is predicted as an intended character string to be inputted by the user, to be displayed on the screen as an inputted character string candidate, with use of a character selected from the inputted character candidates; and
(3) a converted character string candidate display section configured to carry out a process of causing converted character string candidates, which have been prepared by converting the inputted character string candidate, to be displayed on the screen.

Moreover, in order to attain the object, a method of the present invention for controlling a display device includes the steps of:
(1) recognizing a handwritten character inputted by a user through touch on a screen of the display device and causing candidates of a character, which is predicted as an intended character to be inputted by the user, to be displayed on the screen as inputted character candidates;
(2) causing a candidate of a character string, which is predicted as an intended character string to be inputted by the user, to be displayed on the screen as an inputted character string candidate, with use of a character selected from the inputted character candidates; and
(3) causing converted character string candidates, which have been prepared by converting the inputted character string candidate, to be displayed on the screen.

According to the configuration and the method, when the user has inputted a handwritten character on the screen, an inputted character string candidate prepared from the inputted character, an inputted character string candidate, and converted character string candidates are displayed on the screen.

The user can select an intended converted character string from the converted character string candidates. For example, in a case where the user does not know how to write an intended kanji character to be inputted, the user handwrites a reading for the kanji character on the screen. Then, kanji characters, which have been obtained by converting the handwritten characters, are displayed on the screen as converted character string candidates. Therefore, the user can select an intended kanji character from the converted character string candidates thus displayed.

That is, according to the display control device of the present invention, inputted character candidates prepared from a recognized handwritten character, an inputted character string candidate, and converted character string candidates are displayed, and the user can select an intended converted character string candidate by casting a glance at the converted character string candidates. Moreover, by viewing the inputted character candidates and the inputted character string candidate, the user can immediately confirm whether or not the converted character string candidates have been prepared by converting a properly recognized character.

As such, the display control device of the present invention can improve convenience for the user to input handwritten characters.

Note that an electronic apparatus which includes a display device and the display control device configured to control the display device as above described can bring about an effect similar to the above described one.

Moreover, each of the sections of the display control device can be achieved by controlling a computer with a control program. Moreover, by causing the control program to be stored in a computer-readable storage medium, the control program can be executed on any computer.

Advantageous Effects of Invention

As above described, the display control device of the present invention includes: an inputted character candidate display section configured to carry out a process of (i) recognizing a handwritten character inputted by a user through touch on a screen and (ii) causing candidates of a character, which is predicted as an intended character to be inputted by the user, to be displayed on the screen as inputted character candidates; an inputted character string candidate display section configured to carry out a process of causing a candidate of a character string, which is predicted as an intended character string to be inputted by the user, to be displayed on the screen as an inputted character string candidate, with use of a character selected from the inputted character candidates; and a converted character string candidate display section configured to carry out a process of causing converted character string candidates, which have been prepared by converting the inputted character string candidate, to be displayed on the screen.

Moreover, the method of the present invention for controlling a display device includes the steps of: recognizing a handwritten character inputted by a user through touch on a screen of the display device and causing candidates of a character, which is predicted as an intended character to be inputted by the user, to be displayed on the screen as inputted character candidates; causing a candidate of a character string, which is predicted as an intended character string to be inputted by the user, to be displayed on the screen as an inputted character string candidate, with use of a character selected from the inputted character candidates; and causing converted character string candidates, which have been prepared by converting the inputted character string candidate, to be displayed on the screen.

This makes it possible to bring about an effect as follows: that is, in a case where a plurality of handwritten characters have been inputted, the plurality of handwritten characters are recognized and combined as a character string, and converted character string candidates prepared from the character string are displayed, and the user can convert the character string by selecting any of the converted character string candidates.

DESCRIPTION OF EMBODIMENTS

The following description will discuss details of an embodiment of the present invention with reference to FIGS. 1 through 13. Note that the descriptions of dimensions and shapes of constituent members, and their relative arrangements etc. in the embodiment merely exemplify an embodiment of the present invention, and therefore should not be construed as limiting the scope of the invention only to them unless otherwise noted.

[Configuration of Electronic Apparatus 1]

Figure 1:
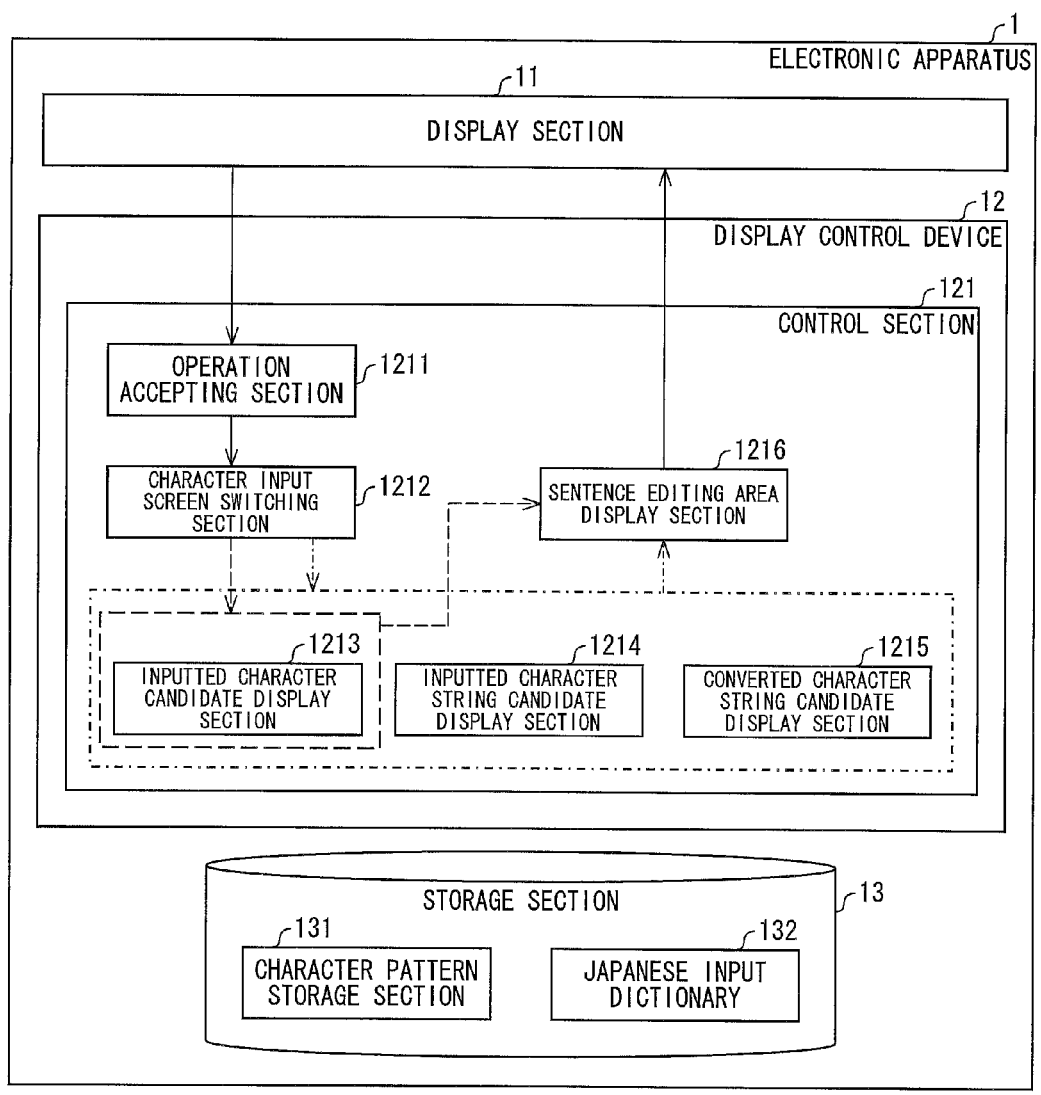
FIG. 1 is a block diagram illustrating a configuration of an electronic apparatus in accordance with an embodiment of the present invention.

First, the following description will discuss, with reference to FIG. 1, a configuration of an electronic apparatus 1 in accordance with the present embodiment.

FIG. 1 is a block diagram illustrating the configuration of the electronic apparatus 1.

The electronic apparatus 1 includes a display section 11, a display control device 12, and a storage section 13.

The display section 11 is configured by a liquid crystal display device (not illustrated) and a touch panel (not illustrated) provided on the liquid crystal display device.

When a finger of a user, a touch pen, or the like has made contact with the touch panel, the display section 11 outputs (i) detection information for notifying detection of the touch and (ii) touch position information indicative of a position at which the touch has been detected. Note that the touch panel is not limited to a particular one, provided that the touch panel can detect a contact by the user and touch position. Examples of the touch panel encompass a pressure-sensitive touch panel, a capacitive touch panel, and a light sensitive touch panel.

The display control device 12 receives an output from the display section 11 and thus accepts a touch operation on the touch panel by the user. Moreover, the display control device 12 controls the display section 11 to display. Specifically, the display control device 12 controls the display section 11 to display a character inputting screen P (see FIG. 2). Note that the display control device 12 and the character inputting screen P will be described later in detail.

The storage section 13 has a character pattern storage section 131 and a Japanese input dictionary 132. In the character pattern storage section 131, pieces of information are stored which relate to features of various character shapes of numerals, kana characters, kanji characters, alphabetic characters, and the like. Moreover, the Japanese input dictionary 132 stores (i) information relating to character strings each of which is often inputted following a certain character and (ii) information relating to character strings each of which is statistically often selected as a character string into which the character is converted.

[Character Inputting Screen P]

Figure 2:
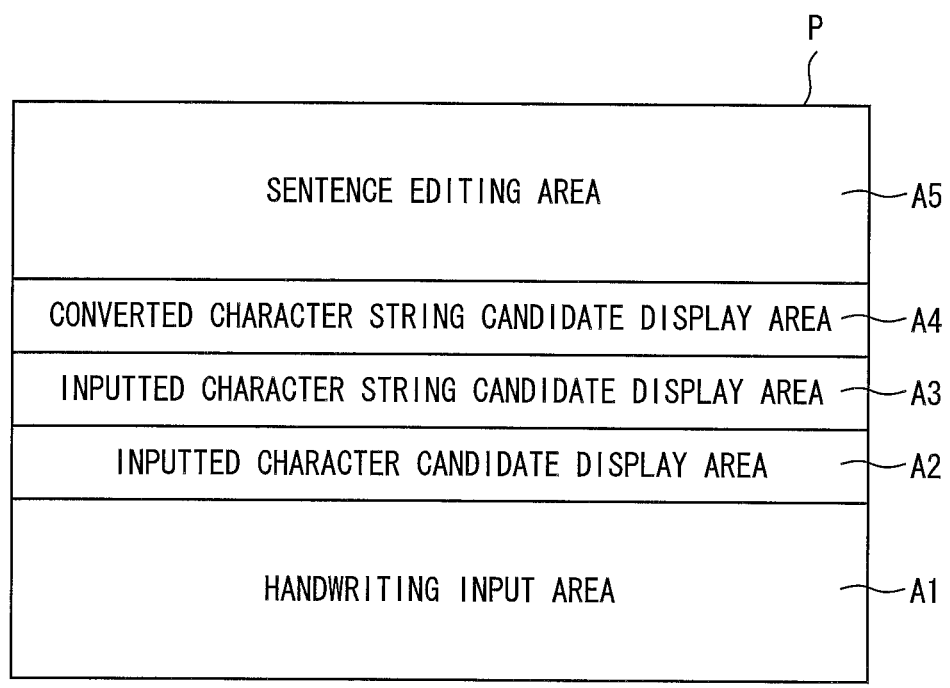
FIG. 2 is a view schematically illustrating a screen displayed on a display section of the electronic apparatus illustrated in FIG. 1.

FIG. 2 is a view schematically illustrating the character inputting screen P that is displayed in a part or whole of a screen region of the display section 11 by the display control device 12.

As illustrated in FIG. 2, the character inputting screen P includes 5 areas, i.e., a handwriting input area A1, an inputted character candidate display area A2, an inputted character string candidate display area A3, a converted character string candidate display area A4, and a sentence editing area A5.

Here, in the handwriting input area A1, the user inputs handwritten characters. Moreover, a character strings corresponding to the handwritten character inputted in the handwriting input area A1 are displayed in the inputted character candidate display area A2, the inputted character string candidate display area A3, the converted character string candidate display area A4, and the sentence editing area A5. Note that, in the sentence editing area A5, text data is displayed so that the user can edit a sentence by operating the text data.

[Details of Display Control Device 12]

The following description will discuss details of a configuration of the display control device 12, with reference to FIG. 1 and FIG. 2.

As illustrated in FIG. 1, the display control device 12 includes an operation accepting section 1211, a character input screen switching section 1212, a sentence editing area display section 1216, an inputted character candidate display section 1213, an inputted character string candidate display section 1214, and a converted character string candidate display section 1215.

The operation accepting section 1211 accepts a touch operation by the user on the display section 11. The operation accepting section 1211 accepts a handwritten character inputted through touch on the handwriting input area A1 (see FIG. 2).

The character input screen switching section 1212 switches between character input screens displayed on the display section 11.

The inputted character candidate display section 1213 recognizes a handwritten character which has been accepted by the operation accepting section 1211, and causes candidates of a character, which is predicted as an intended character to be inputted by the user, to be displayed in the inputted character candidate display area A2 (see FIG. 2), as inputted character candidates. Note that the "character which is predicted as an intended character to be inputted by the user" indicates a character that the inputted character candidate display section 1213 has determined by, for example, a pattern matching process to have a feature that is identical with or similar to that of the handwritten character, i.e., a character that has been determined by the inputted character candidate display section 1213 as being small in recognition distance (i.e., having a high degree of similarity). Hereinafter, such a character is sometimes referred to as "effective inputted character candidate".

The inputted character string candidate display section 1214 (i) prepares, with reference to the Japanese input dictionary 132, an inputted character string candidate which is a candidate of a character string that is predicted as an intended character string to be inputted by the user and (ii) causes the inputted character string candidate to be displayed in the inputted character string candidate display area A3 (see FIG. 2).

The converted character string candidate display section 1215 causes converted character string candidates, which have been obtained by converting the inputted character string candidate, to be displayed in the converted character string candidate display area A4. Note that the conversion of characters includes kana-kanji conversion, thesaurus conversion (synonym conversion), and same sound kanji character conversion, etc., in addition to predictive conversion.

The sentence editing area display section 1216 causes an inputted character string candidate, which is displayed in the inputted character string candidate display area A3, to be displayed in the sentence editing area A5 (see FIG. 2) as an undetermined character string. In a case where the user has touched any of the converted character string candidates displayed in the converted character string candidate display area A4, the sentence editing area display section 1216 causes the touched converted character string candidate to be displayed in the sentence editing area A5 as a determined character string.

[Operation of Display Control Device 12]

Figure 3:
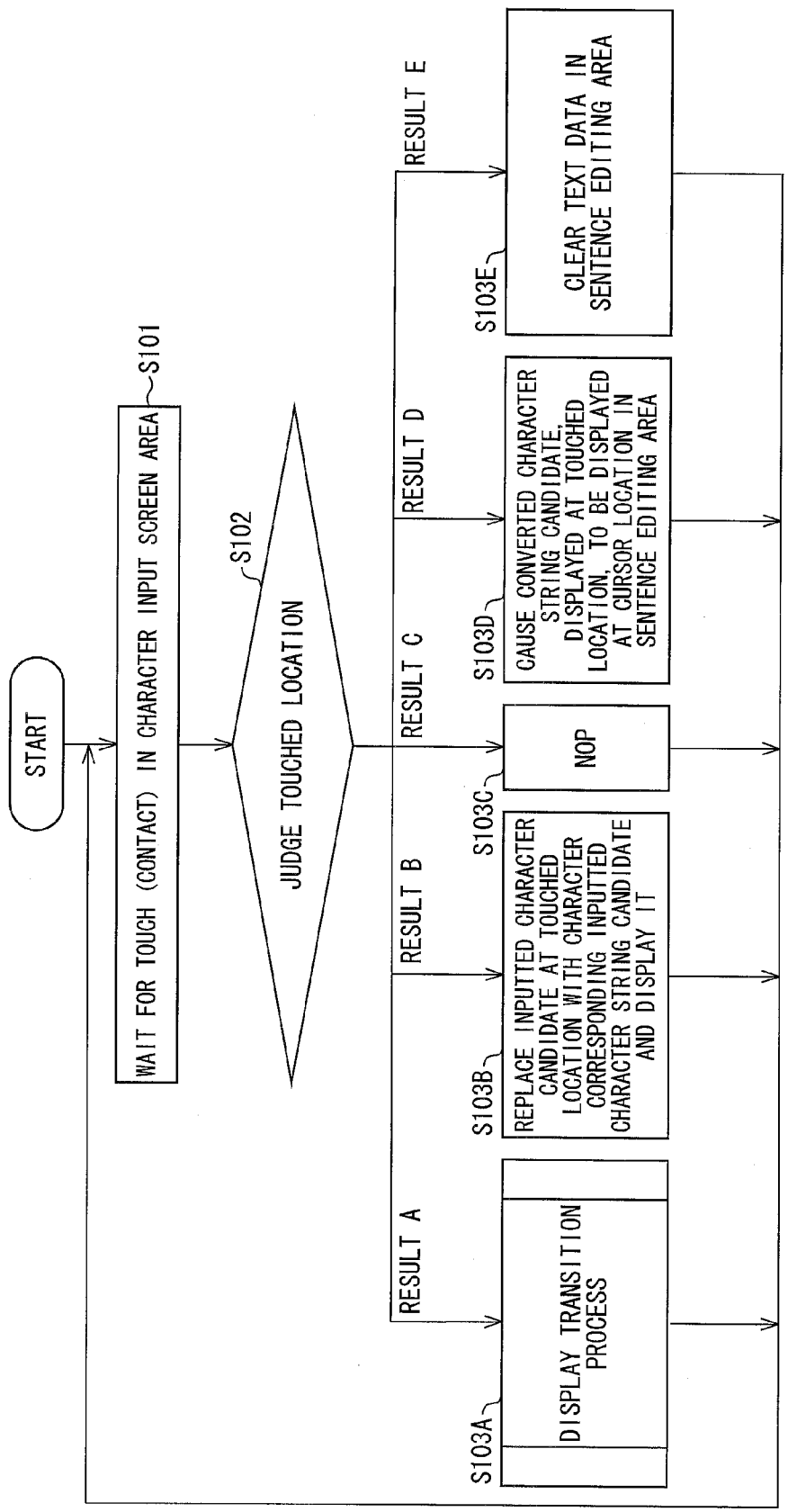
FIG. 3 is a flowchart schematically showing an operation of a display control device included in the electronic apparatus illustrated in FIG. 1.

The following description will discuss an outline of operation of the display control device 12, with reference to a flowchart illustrated in FIG. 3.

First, the operation accepting section 1211 is in a state of waiting for a touch on the character inputting screen P (S101).

When the user has touched the character inputting screen P, the operation accepting section 1211 judges which one of the areas A1 through A5 of the character inputting screen P the user has touched (S102).

In a case where the operation accepting section 1211 has detected a touch on the handwriting input area A1 (Result A in S102), the display transition process is carried out by the sections 1213 through 1216 of the control section 121 (S103A). Note that the display transition process will be described later in detail.

Alternatively, in a case where the operation accepting section 1211 has detected a touch on an inputted character candidate displayed in the inputted character candidate display area A2 (Result B in S102), the inputted character string candidate display section 1214 replaces, with the touched inputted character candidate, a character which (i) constitutes a character string displayed in the inputted character string candidate display area A3 and (ii) corresponds to an inputted character candidate displayed in the inputted character candidate display area A2 (S103B). For example, in a case where an inputted character string candidate "いろは(I RO HA)" is displayed in the inputted character string candidate display area A3 and inputted character candidates ("は (HA)", "ほ (HO)") each of which corresponds to the third character of the inputted character string candidate "いろは (I RO HA)" are displayed in the inputted character candidate display area A2 and the user has touched the inputted character candidate "ほ (HO)" displayed in the inputted character candidate display area A2, an inputted character string candidate "いろほ (I RO HO)" is to be displayed instead of the inputted character string candidate "いろは (I RO HA)" in the inputted character string candidate display area A3. In a case where the inputted character string candidate is updated as in this example, the converted character string candidate display section 1215 updates the converted character string candidate, which has been displayed in the converted character string candidate display area A4, into a converted character string candidate obtained by converting an updated inputted character string candidate. Moreover, the sentence editing area display section 1216 updates the inputted character string candidate displayed in the sentence editing area A5.

Alternatively, in a case where the operation accepting section 1211 has detected a touch on the inputted character string candidate display area A3 (Result C in S102), the control section 121 carries out nothing (NOP; no operation) (S103C).

Alternatively, in a case where the operation accepting section 1211 has detected a touch on a converted character string candidate displayed in the converted character string candidate display area A4 (Result D in S102), the sentence editing area display section 1216 replaces a character string, which is located at a cursor position in the sentence editing area A5, with the converted character string candidate thus touched (S103D).

Alternatively, in a case where the operation accepting section 1211 has detected a touch on the sentence editing area A5 (Result E in S102), the sentence editing area display section 1216 clears text data displayed in the sentence editing area A5 (S103E).

After any of the steps S103A through S103E is carried out, the operation accepting section 1211 returns to the state of waiting for a touch on the character inputting screen P (S101).

[Display Transition Process]

Figure 4:
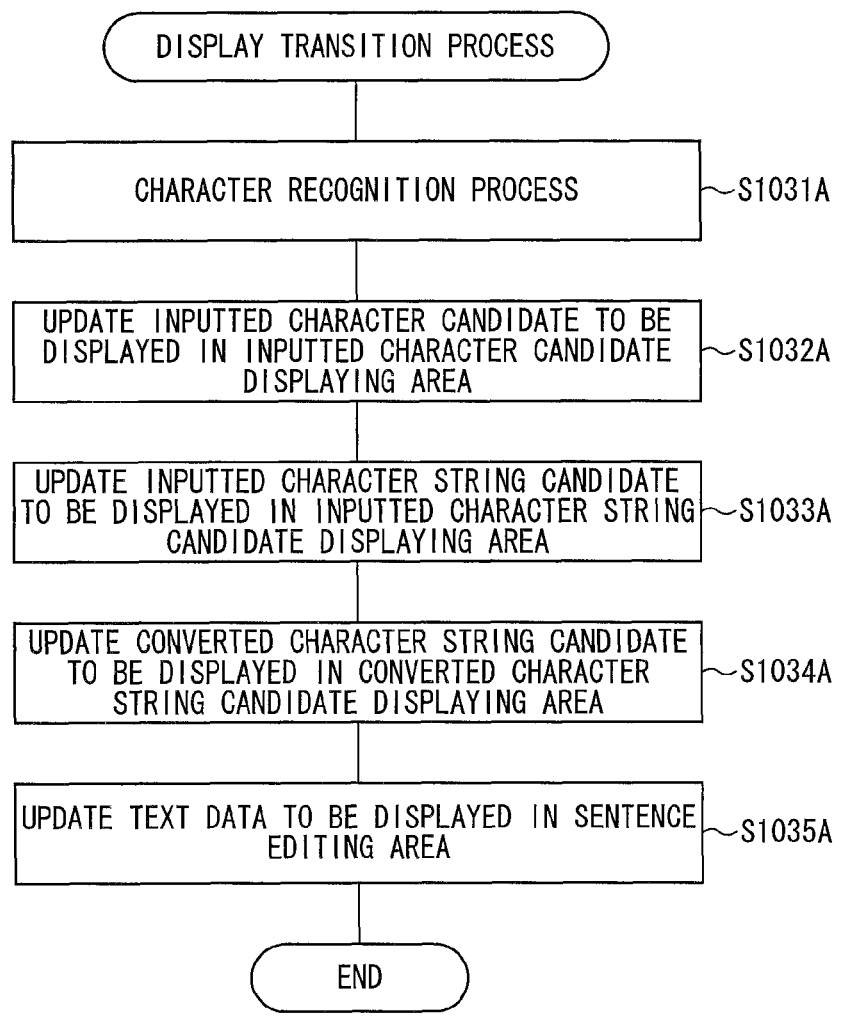
FIG. 4 is a flowchart showing a flow of a display transition process carried out by a control section of the electronic apparatus illustrated in FIG. 1.

As above described, in a case where the user has inputted a handwritten character in the handwriting input area A1, the sections 1213 through 1216 of the control section 121 carry out a display transition process. The following description will discuss the display transition process with reference to a flowchart of FIG. 4 and FIGS. 5 and 6. FIG. 4 is a flowchart illustrating a flow of the display transition process. Each of FIGS. 5 and 6 is an explanatory view for explaining screen transition carried out in a case where Japanese (hiragana characters) is inputted in the handwriting input area A1.

Figure 5:
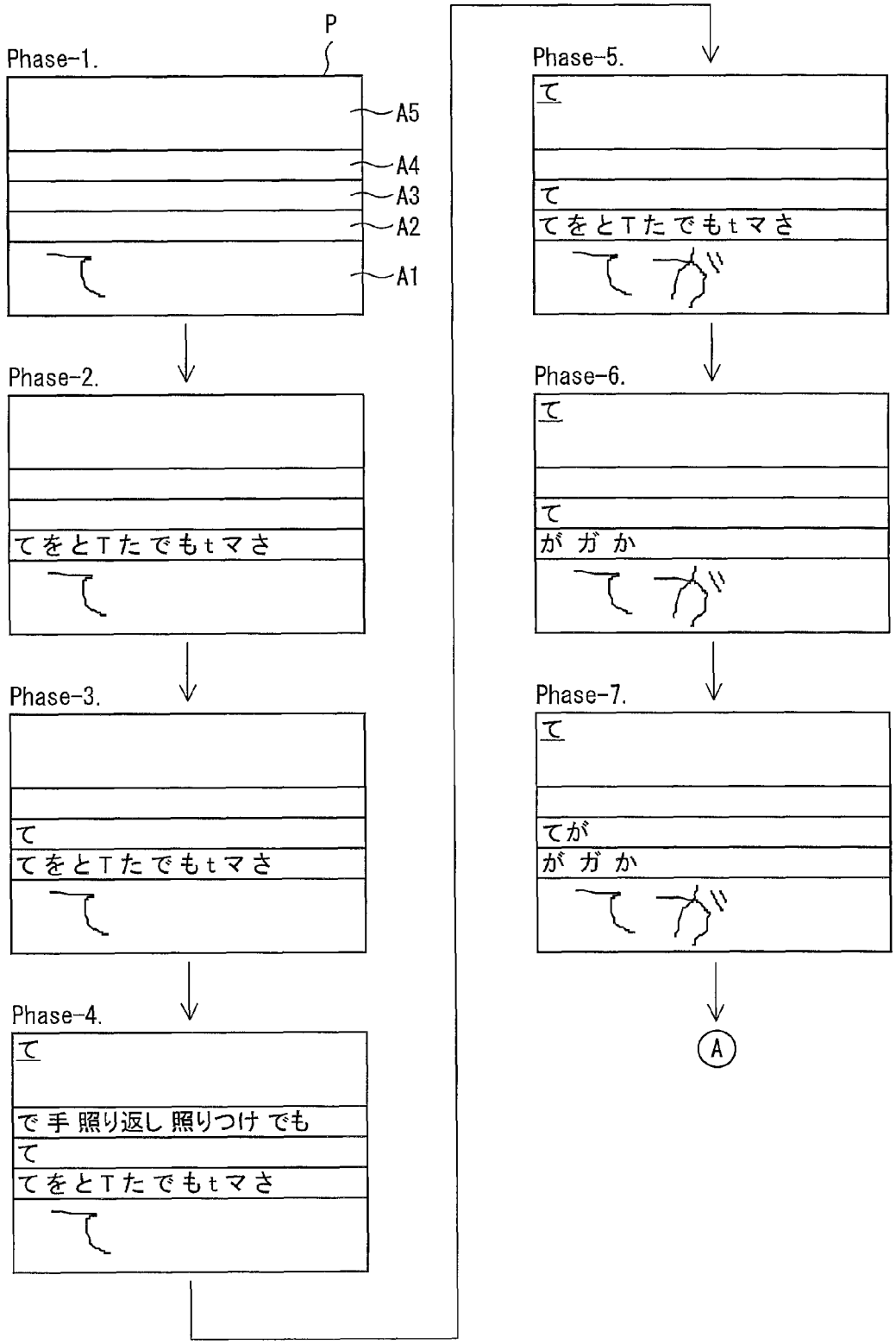
FIG. 5 is an explanatory view 1 for explaining transition of a screen in the display transition process.
Figure 6:
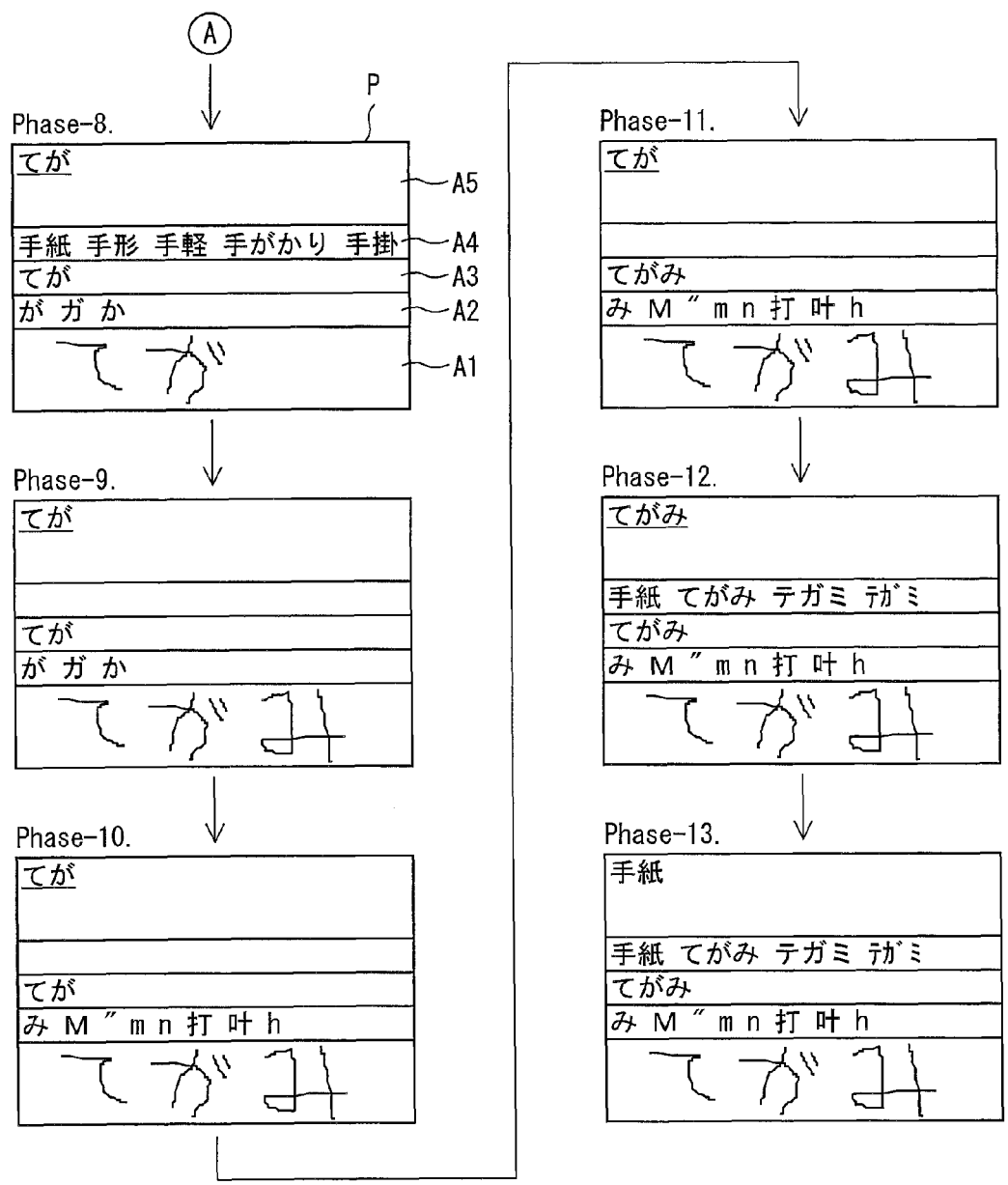
FIG. 6 is an explanatory view 2 for explaining transition of a screen in the display transition process.

First, in a case where the operation accepting section 1211 has detected an input on the handwriting input area A1, the inputted character candidate display section 1213 carries out a character recognition process on a handwritten character "て (TE)?" (which has a letter shape predicted as a character "て (TE)") inputted in the handwriting input area A1 by the user (S1031A; see Phase 1 in FIG. 5).

Next, the inputted character candidate display section 1213 determines, based on a result of the character recognition, candidates of a character that is predicted as an intended character to be inputted by the user, and causes the candidates thus determined to be displayed in the inputted character candidate display area A2 as inputted character candidates (S1032A; see Phase 2 in FIG. 5).

Here, when the inputted character candidate display section 1213 determines the inputted character candidates, the inputted character candidate display section 1213 first extracts a feature of a letter shape of the handwritten character ("て (TE)?") by character recognition. Next, the inputted character candidate display section 1213 compares (pattern matching) the extracted feature of the handwritten character with features of characters stored in the character pattern storage section 131. The inputted character candidate display section 1213 then determines one or more characters as the inputted character candidates in an order of increasing recognition distance.

When the inputted character candidate display section 1213 causes the inputted character candidates to be displayed in the inputted character candidate display area A2, the inputted character candidate display section 1213 causes the inputted character candidates to be displayed in an order of increasing recognition distance with respect to the handwritten character. In Phase 2, 10 inputted character candidates, which are arranged as follows, i.e., "て (TE)"→"を (WO)"→"と (TO)"→(and so forth) from the left, are displayed in the inputted character candidate display area A2. These inputted character candidates are arranged in the order of increasing recognition distance from the left, and the inputted character candidate "て (TE)" is an inputted character candidate whose recognition distance with respect to the handwritten character "て (TE)?" is shortest (hereinafter, referred to as "most effective inputted character candidate").

Next, the inputted character string candidate display section 1214 prepares an inputted character string candidate, which is a candidate of a character string that is predicted as an intended character string to be inputted by the user, with the use of the inputted character candidates displayed in the inputted character candidate display area A2 (S1033A; see Phase 3 in FIG. 5). Specifically, the inputted character string candidate display section 1214 prepares an inputted character string candidate with the use of the most effective inputted character candidate ("て (TE)") out of the 10 inputted character candidates. The inputted character string candidate display section 1214 causes the character string "て (TE)" thus prepared to be displayed in the inputted character string candidate display area A3 as the inputted character string candidate.

Subsequently, the converted character string candidate display section 1215 causes converted character string candidates, which are obtained by converting the inputted character string candidate ("て (TE)"), to be displayed in the converted character string candidate display area A4 (S1034A; see Phase 4 in FIG. 5).

In this case, the converted character string candidate display section 1215 extracts character strings, which are statistically often converted from the inputted character string candidate ("て (TE)"), with reference to the Japanese input dictionary 132 stored in the storage section 13, and determines such extracted character strings as the converted character string candidates. That is, the converted character string candidate display section 1215 carries out predictive conversion of the inputted character string candidate ("て (TE)"). In a case of inputting Japanese, converted character string candidates obtained by the predictive conversion encompass a character string made up of (i) various characters such as kanji characters, a mixture of kanji character and kana character, half-width (single-byte)/full-width (double-byte) katakana characters, and hiragana characters and (ii) half-width (single-byte)/full-width (double-byte) numerals. On the screen of Phase 4, five converted character string candidates ("で (DE)", "千 (TE)", "照り返し (TERIKAESHI)", "照りつけ (TERITSUKE)", and "でも (DEMO)") are displayed in the converted character string candidate display area A4 as a result of predictive conversion of the inputted character string candidate ("て (TE)").

Moreover, the sentence editing area display section 1216 causes an inputted character string candidate ("て (TE)"), which is displayed in the inputted character string candidate display area A3, to be displayed in the sentence editing area A5 (S1035A; see Phase 4).

After that, the operation accepting section 1211 returns to the state of waiting for a touch on the character inputting screen P (step S101 of FIG. 3). Then, when the user has additionally inputted another handwritten character in the handwriting input area A1, the sections carry out the processes of the steps S1031A through S1035A again, and thus the character strings displayed in the areas A2 through A5 are updated. The following description will discuss a display transition process carried out when the user has inputted a second character.

First, when the user has inputted a handwritten character "が (GA)?" on the right of the character "て (TE)?" in the handwriting input area A1, the inputted character candidate display section 1213 recognizes the new handwritten character ("が (GA)?") (S1031A; see Phase 5 in FIG. 5), and causes inputted character candidates ("が (GA)" "ガ (GA)" "か (KA)"), which have been newly obtained, to be displayed in the inputted character candidate display area A2 (S1032A; see Phase 6 in FIG. 5).

Next, the inputted character string candidate display section 1214 prepares a new inputted character string candidate ("てが (TEGA)") by combining the inputted character string candidate ("て (TE)"), which has been displayed in advance, with the most effective inputted character candidate ("が (GA)"), and causes the inputted character string candidate ("てが (TEGA)") to be displayed in the inputted character string candidate display area A3 (S1033A; see Phase 7 in FIG. 5).

Subsequently, the converted character string candidate display section 1215 causes new converted character string candidates ("手紙 (TEGAMI)", "手形 (TEGATA)", "手軽 (TEGARU)", etc.), which have been obtained by predictive conversion of the new inputted character string candidate ("てが (TEGA)"), to be displayed in the converted character string candidate display area A4 (S1034A; see Phase 8 in FIG. 6).

The sentence editing area display section 1216 causes the inputted character string candidate ("てが (TEGA)"), which is displayed in the inputted character string candidate display area A3, to be displayed in the sentence editing area A5 (S1035A; see Phase 8). In this case, the sentence editing area display section 1216 causes the new converted character string candidate to be displayed such that an undetermined character string, i.e., the character string which is located at a cursor position in the sentence editing area A5, is replaced. On the screen of Phase 7, the cursor is located below the converted character string candidate "て (TE)", and the converted character string candidate "て (TE)" is replaced by the new converted character string candidate "てが (TEGA)" on the screen of Phase 8.

Subsequent to Phase 8, i.e., Phases 9 through 12 show a screen transition from when a handwritten character "み (MI)?" is inputted in the handwriting input area A1 and to when a character string "てがみ (TEGAMI)" is displayed in the sentence editing area A5. Note that the display transition process carried out in Phases 9 through 12 is similar to that carried out in Phases 5 through 8, and is not described repeatedly.

Note that, as early described, the sentence editing area display section 1216 causes a converted character string candidate, which has been touched by the user from among the converted character string candidates displayed in the converted character string candidate display area A4, to be displayed in the sentence editing area A5 as a determined character string (Step S103D in FIG. 3). The screen of Phase 13 in FIG. 6 illustrates a case in which the user has touched a converted character string candidate (" 手紙 (TEGAMI)") from among the converted character string candidates, and the character string " 下紙 (TEGAMI)" is displayed in the sentence editing area A5 as the determined character string.

As such, according to the display control device 12, in a case where the user has inputted a plurality of characters, a character string made up of the plurality of characters is displayed in the sentence editing area A5 as an undetermined character string, and a character string is determined when the user has selected (touched) any of converted character string candidates displayed in the converted character string candidate display area A4. Therefore, the user is not requested to determine an inputted character each time the user inputs one (1) character, unlike the early described character recognizing device (of Patent Literature 1). This allows the user to smoothly input characters.

[Display Transition when Inputting Alphabetic Characters]

In the above descriptions, the screen transition has been discussed in which Japanese (hiragana characters) is inputted in the handwriting input area A1. Note, however, that other languages can be inputted by handwriting.

Figure 7:
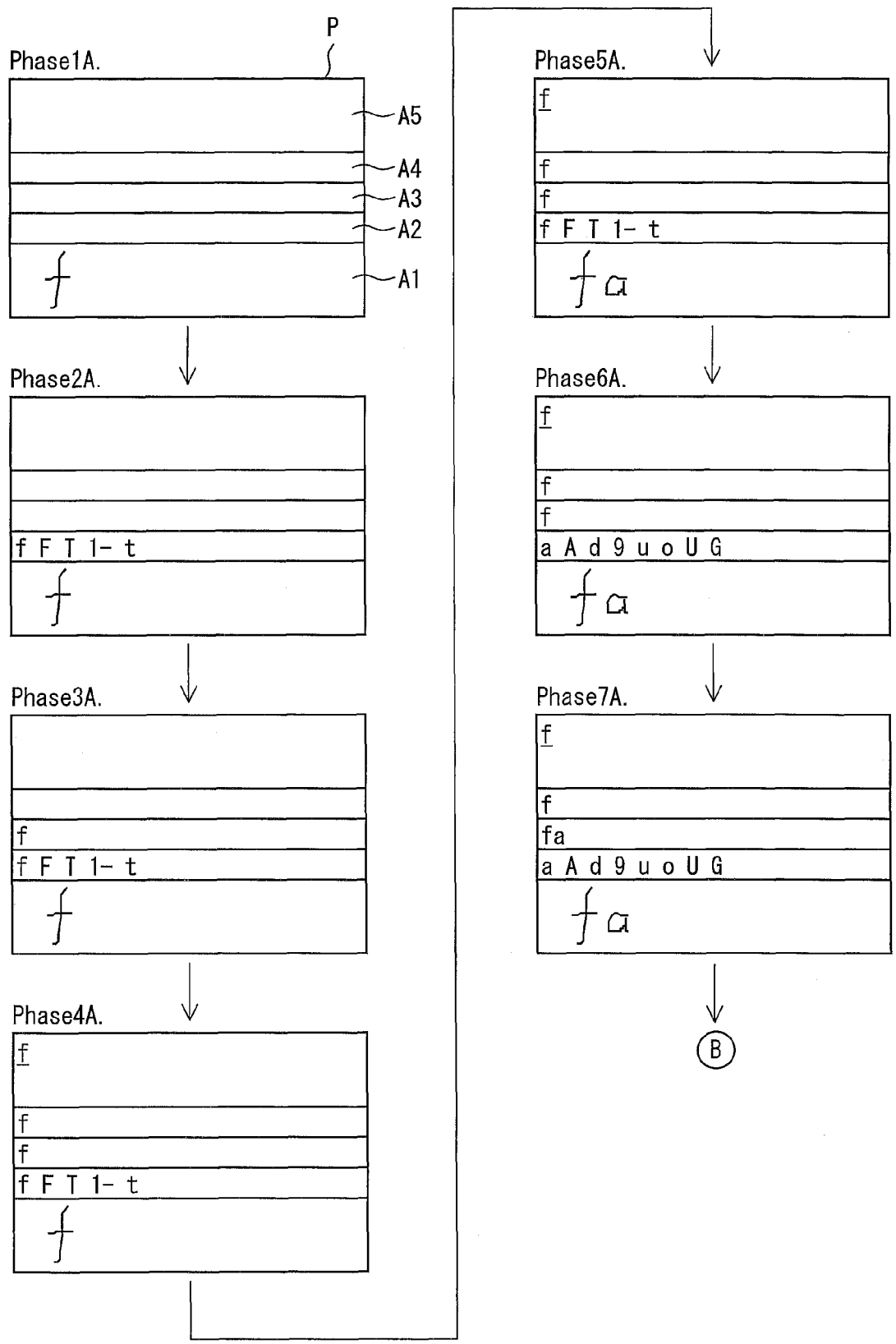
FIG. 7 is an explanatory view 3 for explaining transition of a screen in the display transition process.
Figure 8:
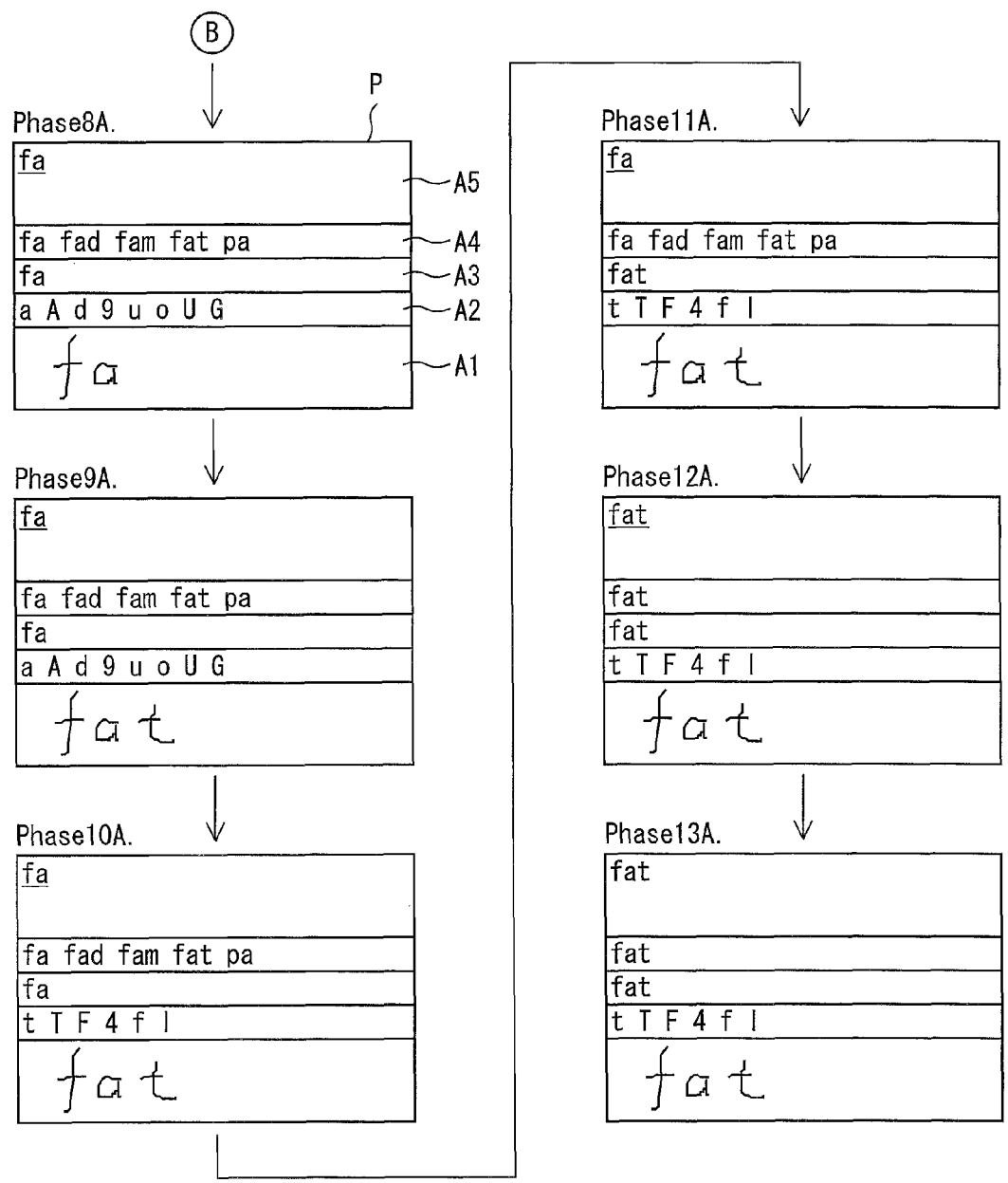
FIG. 8 is an explanatory view 4 for explaining transition of a screen in the display transition process.

The following description will discuss processes carried out by the sections in an example case where English (alphabetic character) is inputted, with reference to a flowchart of FIG. 3 and FIGS. 7 and 8. Note that the storage section 13 further stores an English input dictionary and an English thesaurus.

First, in a case where a handwritten character "f?" is inputted by the user in the handwriting input area A1, the inputted character candidate display section 1213 recognizes the inputted character ("f?") (S1031A; see Phase 1A in FIG. 7).

Next, the inputted character candidate display section 1213 causes inputted character candidates ("f", "F", "T", "1-t"), which have been obtained as a result of character recognition, to be displayed in the inputted character candidate display area A2 (S1032A; see Phase 2A in FIG. 7).

Subsequently, the inputted character string candidate display section 1214 causes an inputted character candidate ("f"), which is a most effective inputted character candidate, to be displayed in the inputted character string candidate display area A3 (S1033A; see Phase 3A in FIG. 7).

Further, the converted character string candidate display section 1215 causes a converted character string candidate ("f"), which has been obtained by converting the inputted character string candidate ("f"), to be displayed in the converted character string candidate display area A4 (S1034A; see Phase 4A in FIG. 7).

Moreover, the sentence editing area display section 1216 causes the inputted character string candidate ("f"), which is displayed in the inputted character string candidate display area A3, to be displayed in the sentence editing area A5 (S1035a; see Phase 4A).

After that, the operation accepting section 1211 returns to the state of waiting for a touch on the character inputting screen P (step S101 in FIG. 3).

In a case where the user has inputted a handwritten character "a?" on the right of the character "f?" in the handwriting input area A1, the inputted character candidate display section 1213 recognizes the new handwritten character ("a?") (S1031A; see Phase 5A in FIG. 7) and causes new inputted character candidates ("a", "A", "d", etc.) obtained from the new handwritten character ("a?") to be displayed in the inputted character candidate display area A2 (S1032A; see Phase 6A in FIG. 7).

Next, the inputted character string candidate display section 1214 prepares a new inputted character string candidate ("fa") by combining the inputted character string candidate ("f"), which has been displayed in advance, with a most effective inputted character candidate ("a"), and causes the new inputted character string candidate ("fa") to be displayed in the inputted character string candidate display area A3 (S1033A; see Phase 7A in FIG. 7).

Subsequently, the converted character string candidate display section 1215 carries out predictive conversion on the new inputted character string candidate ("fa") with reference to the English input dictionary and the thesaurus stored in the storage section 13, and causes new converted character string candidates ("fa", "fad", "fam", etc.) thus obtained to be displayed in the converted character string candidate display area A4 (S1034A; see Phase 8A in FIG. 8).

Moreover, the sentence editing area display section 1216 causes the inputted character string candidate ("fa") which is displayed in the inputted character string candidate display area A3 to be displayed in the sentence editing area A5 (S1035A; see Phase 8A). In this case, the sentence editing area display section 1216 causes the new converted character string candidate ("fa") to be displayed such that a character string located at a cursor position in the sentence editing area A5 (in the screen of Phase 7A, the cursor is displayed below the character string "f") is to be replaced.

Subsequent to Phase 8A, i.e., Phases 9A through 12A show a screen transition from when a handwritten character "t?" is inputted in the handwriting input area A1 and to when a character string "fat" is displayed in the sentence editing area A5. Note that the display transition process carried out in Phases 9A through 12A is similar to that carried out in Phases 5A through 8A, and is not described repeatedly.

Note that the screen of Phase 13A in FIG. 8 illustrates a case in which the user has touched a converted character string candidate ("fat") displayed in the converted character string candidate display area A4, and the character string "fat" is displayed in the sentence editing area A5 as the determined character string (without the cursor).

[Switching of Character Input Screen]

According to the display control device 12, the character inputting screen P can be switched to a different character input screen. The following description will discuss the switching of display in detail, with reference to (a) and (b) of FIG. 9. Note that a state of the display control device 12 displaying the character inputting screen P corresponds to the second character input screen state of the present invention, and a state of the display control device 12 displaying the different character input screen corresponds to the first character input screen state of the present invention.

Hereinafter, the character inputting screen P is referred to as "first character input screen P1" and the different character input screen is referred to as "second character input screen P2".

Figure 9:
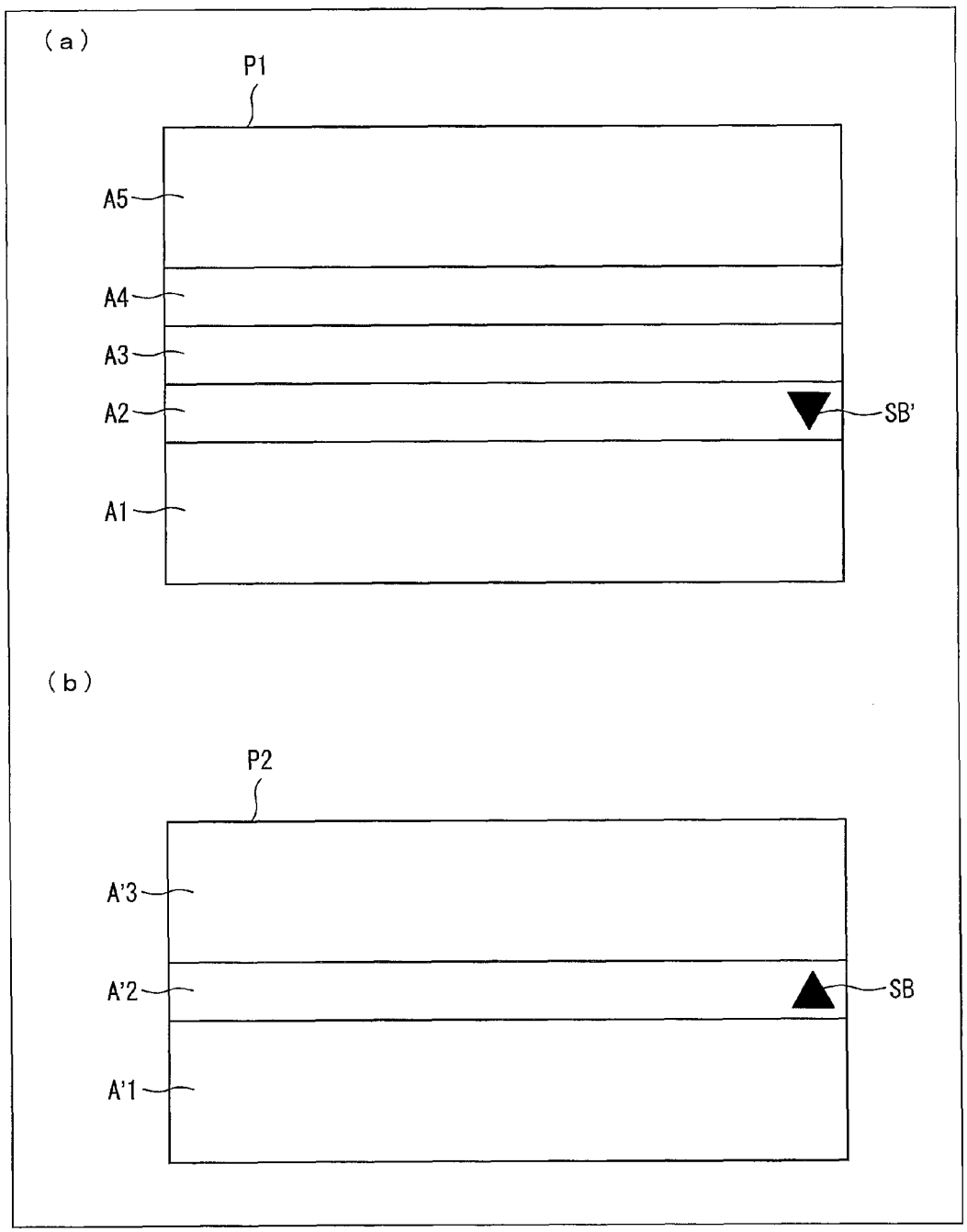
FIG. 9 is a view schematically illustrating a screen displayed on the display section, in which (a) is a first character input screen and (b) is a second character input screen.

(a) and (b) of FIG. 9 schematically illustrate respective two character input screens displayed on the display section 11. (a) of FIG. 9 illustrates the first character input screen P1, and (b) of FIG. 9 illustrates the second character input screen P2.

In the first character input screen P1 illustrated in (a) of FIG. 9, the handwriting input area A1, the inputted character candidate display area A2, the inputted character string candidate display area A3, the converted character string candidate display area A4, and the sentence editing area A5 are displayed as above described in relation to the character inputting screen P.

On the other hand, as illustrated in (b) of FIG. 9, a handwriting input area A'1, an inputted character candidate display area A'2, and a sentence editing area A'3 are displayed in the second character input screen P2.

As illustrated in (a) and (b) of FIG. 9, switching button menus SB and SB', each of which has a triangular shape, are displayed in the second character input screen P2 and the first character input screen P1, respectively. The switching button menus SB and SB' are controlled to be displayed by the character input screen switching section 1212. When the user has touched any of the switching button menus SB and SB', the character input screen switching section 1212 switches between the second character input screen P2 and the first character input screen P1.

Note that, in a case where the second character input screen P2 is switched to the first character input screen P1, the character input screen switching section 1212 can cause a message to be displayed which notifies that a character inputted by handwriting can be converted. This allows the user to know that character input with the use of character conversion can be carried out in the first character input screen P1.

[Details of Second Character Input Screen P2]

Figure 10:
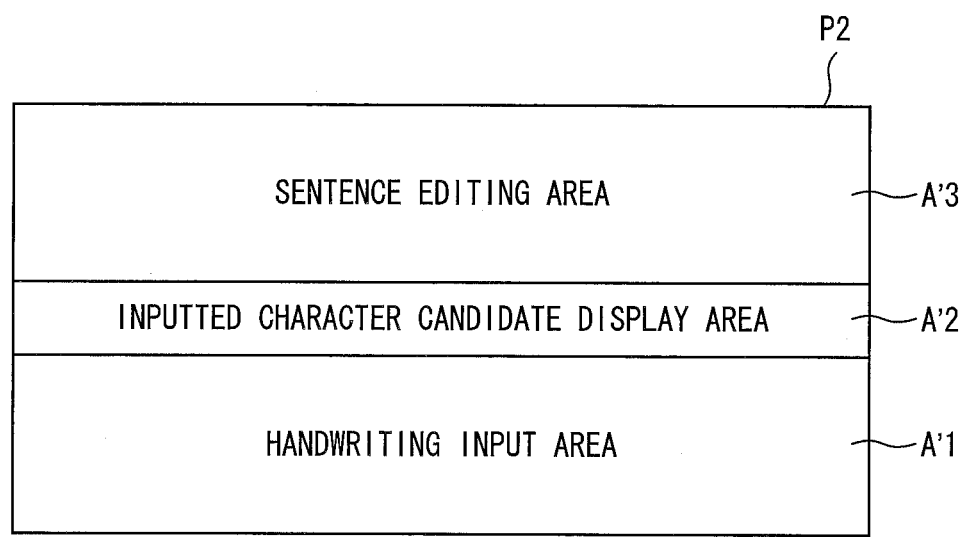
FIG. 10 is a view schematically illustrating the second character input screen displayed on the display section.

The following description will discuss details of the second character input screen P2 with reference to FIG. 10. FIG. 10 schematically illustrates the second character input screen P2.

In FIG. 10, the handwriting input area A'1 corresponds to the handwriting input area A1 in the character inputting screen P illustrated in FIG. 1. That is, the handwriting input area A'1 is used by the user to input handwritten characters.

The inputted character candidate display area A'2 corresponds to the inputted character candidate display area A2 in the character inputting screen P illustrated in FIG. 1. That is, the inputted character candidate display area A'2 displays inputted character candidates prepared by the inputted character candidate display section 1213.

Then, in the sentence editing area A'3, a character is displayed which has been selected by the inputted character candidate display section 1213 out of inputted character candidates displayed in the inputted character candidate display area A'2. In this case, the inputted character candidate display section 1213 selects a most effective inputted character candidate from the inputted character candidates, and causes the most effective inputted character candidate to be displayed in the sentence editing area A'3.

[Example of Switching Character Input Screen]

When the first character input screen P1 is displayed, converted character string candidates prepared from an inputted character string candidate are displayed, and the user selects any of the converted character string candidates. Meanwhile, when the second character input screen P2 is displayed, an inputted character candidate prepared from an inputted character is displayed in the sentence editing area A'3 as a determined inputted character, and therefore the user can smoothly input characters without being requested to carry out an additional operation such as determining input of a converted character string.

Here, the user can input characters while switching the two character input screens depending on circumstances. The following description will discuss possible example cases where the user may switch the character input screens.

For example, the user generally inputs characters in a state where the first character input screen P1 is displayed. Now, in order to determine a character to be inputted in the sentence editing area A5 while the first character input screen P1 is displayed, the user needs to confirm the converted character string candidates and to select a converted character string. Therefore, the operation by the user to input handwritten characters is interrupted by the operation of determining an inputted character. This prevents the user from concentrating on inputting characters, and therefore the user may feel that character input cannot be carried out smoothly. In such a case, the user switches the first character input screen P1 to the second character input screen P2 with the use of the switching button menu SB'. On the second character input screen P2, as above described, the user does not need to carry out an additional operation such as determining input of a converted character string, and therefore the user can input characters smoothly.

Alternatively, the user can switch the character input screen in a case as follows:

The user generally inputs handwritten characters to the handwriting input area A'1 in a state where the second character input screen P2 is displayed on which characters can be inputted smoothly. However, in a case where the user is inputting a certain kanji character, the user sometimes knows only how to read the certain kanji character but does not clearly knows a letter shape of the certain kanji character, and therefore the user cannot handwrite the certain kanji character accurately. In such a case, the user switches the second character input screen P2 to the first character input screen P1 with the use of the switching button menu SB, and the user inputs a reading for an intended kanji character in the handwriting input area A1 while the first character input screen P1 is displayed. As above described, in the first character input screen P1, converted character string candidates are displayed in the converted character string candidate display area A4, and the user selects the intended kanji character from the converted character string candidates. After the intended kanji character can be inputted, the user can return the first character input screen P1 to the second character input screen P2 with the use of the switching button menu SB'.

In the above examples, the user switches the character input screen based on the user's intention. Alternatively, the display control device 12 can prompt the user to switch the character input screen. For example, in a case where the second character input screen P2 is displayed and a recognition distance between a most effective inputted character candidate and a handwritten character is a predetermined level or higher, the character input screen switching section 1212 can (i) cause a message area to be displayed which contains a message indicating that converted character string candidates will be automatically prepared when the first character input screen P1 is used and (ii) cause the switching button menu SB to be displayed with emphasis. In the case where the recognition distance between the inputted character candidate and the handwritten character is the predetermined level or higher, it is likely that the user has handwritten a half-forgotten kanji character. In the message area, for example, a message can be displayed which indicates that "The screen can be switched to a screen on which you can edit text while confirming converted character candidates".

Alternatively, in a case where the first character input screen P1 is displayed and the user has repeatedly carried out an operation of determining an input without character conversion, the character input screen switching section 1212 can (i) cause a message area to be displayed which contains a message indicating that an inputted character candidate itself, which has been prepared from the inputted character, is determined as an inputted character if the second character input screen P2 is used, and (ii) cause the switching button menu SB' to be displayed with emphasis. This is because the user may feel it troublesome to carry out the operation of determining an input by selecting from converted character string candidates, despite a lack of intention to convert characters. In the message area, for example, a message can be displayed which indicates that "The screen can be switched to a screen on which you can input characters without converting handwritten characters".

[Main Points]

As above described, the display control device 12 has the switching button menus SB and SB' for freely switching between the second character input screen P2 and the first character input screen P1. This allows the user to smoothly input characters, and it is also possible to support character conversion with the dictionary.

[Additional Remarks 1]

Figure 11:
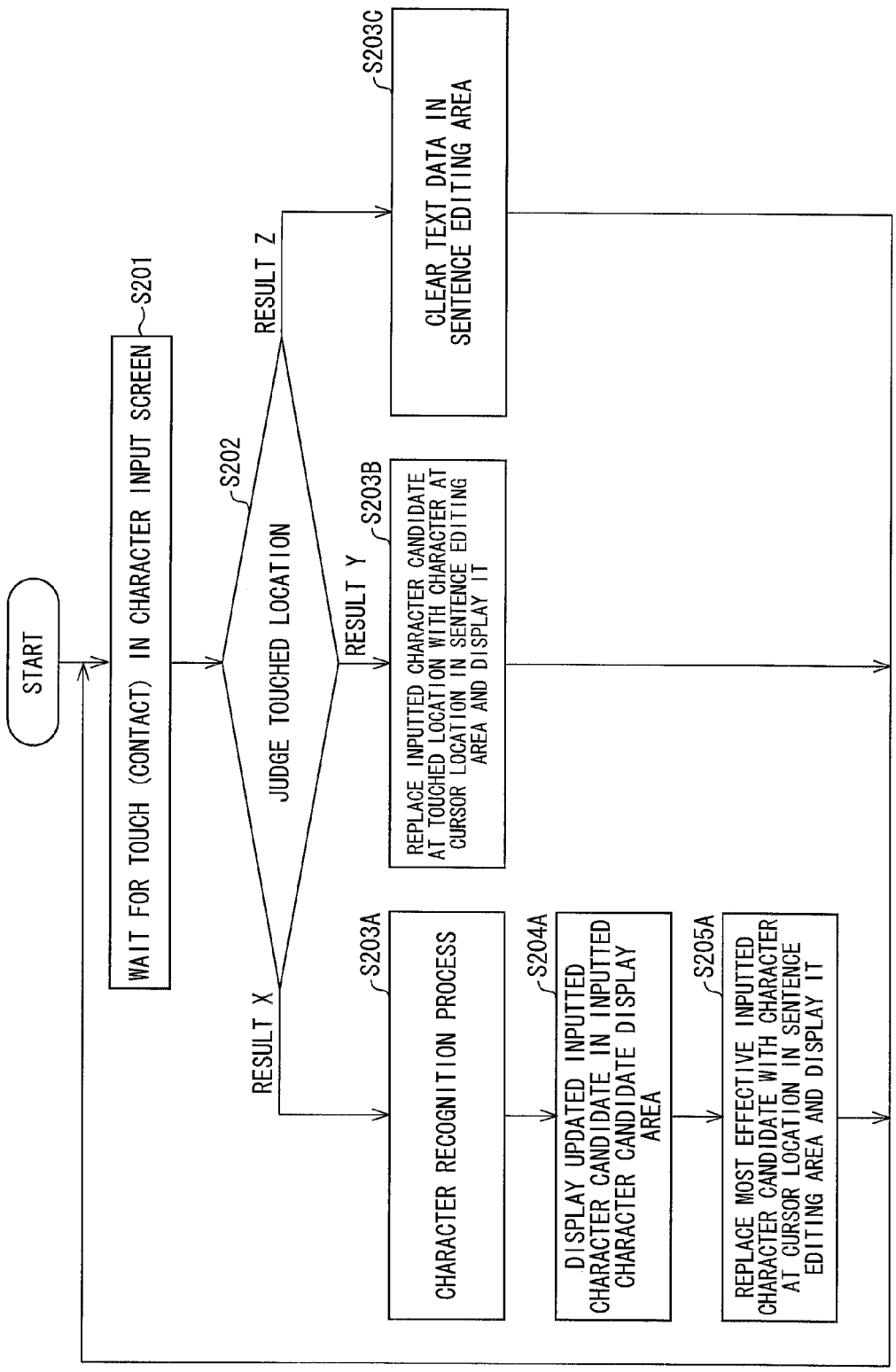
FIG. 11 is a flowchart showing a display transition process carried out by the control section when the second character input screen is displayed on the display section.

The following description will discuss an operation of the display control device 12 in a case where the second character input screen P2 is displayed, with reference to FIG. 11. FIG. 11 is a flowchart illustrating an operation of the display control device 12 while the second character input screen P2 is displayed.

First, the operation accepting section 1211 is in a state of waiting for a contact (touch) on the second character input screen P2 (S201).

When the operation accepting section 1211 has detected a touch on the second character input screen P2, the operation accepting section 1211 judges a location of the touch (S202).

In a case where the operation accepting section 1211 has detected a touch on the handwriting input area A'1 (Result X in S202), the sections 1213 and 1216 of the control section 121 carry out a display transition process α(S203A). Note that the display transition process α will be described later in detail.

In a case where the operation accepting section 1211 has determined that an inputted character candidate displayed in the inputted character candidate display area A'2 has been touched (Result Y in S202), the sentence editing area display section 1216 replaces a character string at a location of the cursor in the sentence editing area A'3 with the inputted character candidate thus touched (S203B).

In a case where the operation accepting section 1211 has detected a touch on the sentence editing area A'3 (Result Z in S202), the sentence editing area display section 1216 clears text data displayed in the sentence editing area A'3 (S203C).

After any of the steps S203A through S203C is carried out, the operation accepting section 1211 returns to the state of waiting for a touch on the second character input screen P2 (S201).

Figure 12:
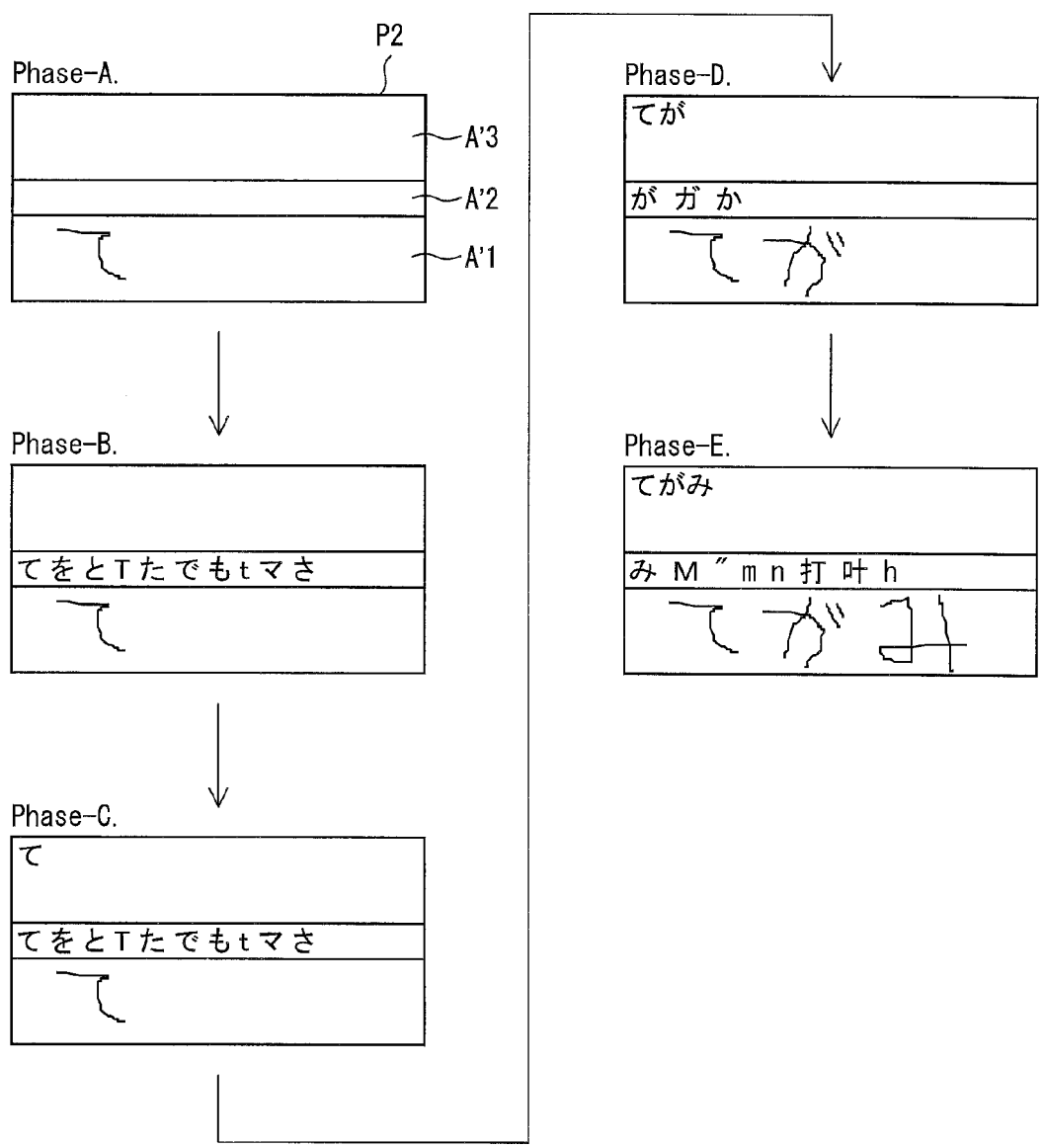
FIG. 12 is an explanatory view 1 for explaining transition of a screen in the display transition process carried out when the second character input screen is displayed on the display section.

The following description will discuss a flow of the display transition process α with reference to FIG. 11 and FIG. 12. Note that FIG. 12 is an explanatory view for explaining a screen transition while the display transition process α is being carried out.

First, in a case where the user has inputted a handwritten character "て (TE)?" in the handwriting input area A'1, the inputted character candidate display section 1213 recognizes the handwritten character ("て (TE)?") thus inputted (S203A; see Phase A in FIG. 12).

Next, the inputted character candidate display section 1213 (i) prepares inputted character candidates ("て (TE)", "を (WO)", "と (TO)", etc.) from a result of the character recognition and (ii) causes the inputted character candidates to be displayed in the inputted character candidate display area A'2 (S204A; see Phase B in FIG. 12).

Subsequently, the sentence editing area display section 1216 causes a character, which has been selected from the inputted character candidates displayed in the inputted character candidate display area A'2, to be displayed in the sentence editing area A'3 (S205A; see Phase C in FIG. 12). In this case, the sentence editing area display section 1216 selects, from the inputted character candidates, a most effective inputted character candidate whose recognition distance to the handwritten character ("て (TE)?") is the shortest, and causes the most effective inputted character candidate to be displayed in the sentence editing area A'3 as a determined inputted character.

Further, in a case where the user has newly inputted an additional handwritten character in the handwriting input area A'1, character strings displayed in the inputted character candidate display area A'2 and the sentence editing area A'3 are updated. Phases D and E of FIG. 12 illustrate respective screens in which handwritten characters "が (GA)?" and "み (MI)?" are inputted and then the areas A'1 through A'3 displayed on each of the screens are updated in procedures similar to the above described procedures.

As such, when the user has completed input of the three handwritten characters ("て (TE)?", "が (GA)?", and "み (MI)?"), a character string "てがみ (TEGAMI)" is displayed in the sentence editing area A'3 as in the screen of Phase E.

Figure 13:
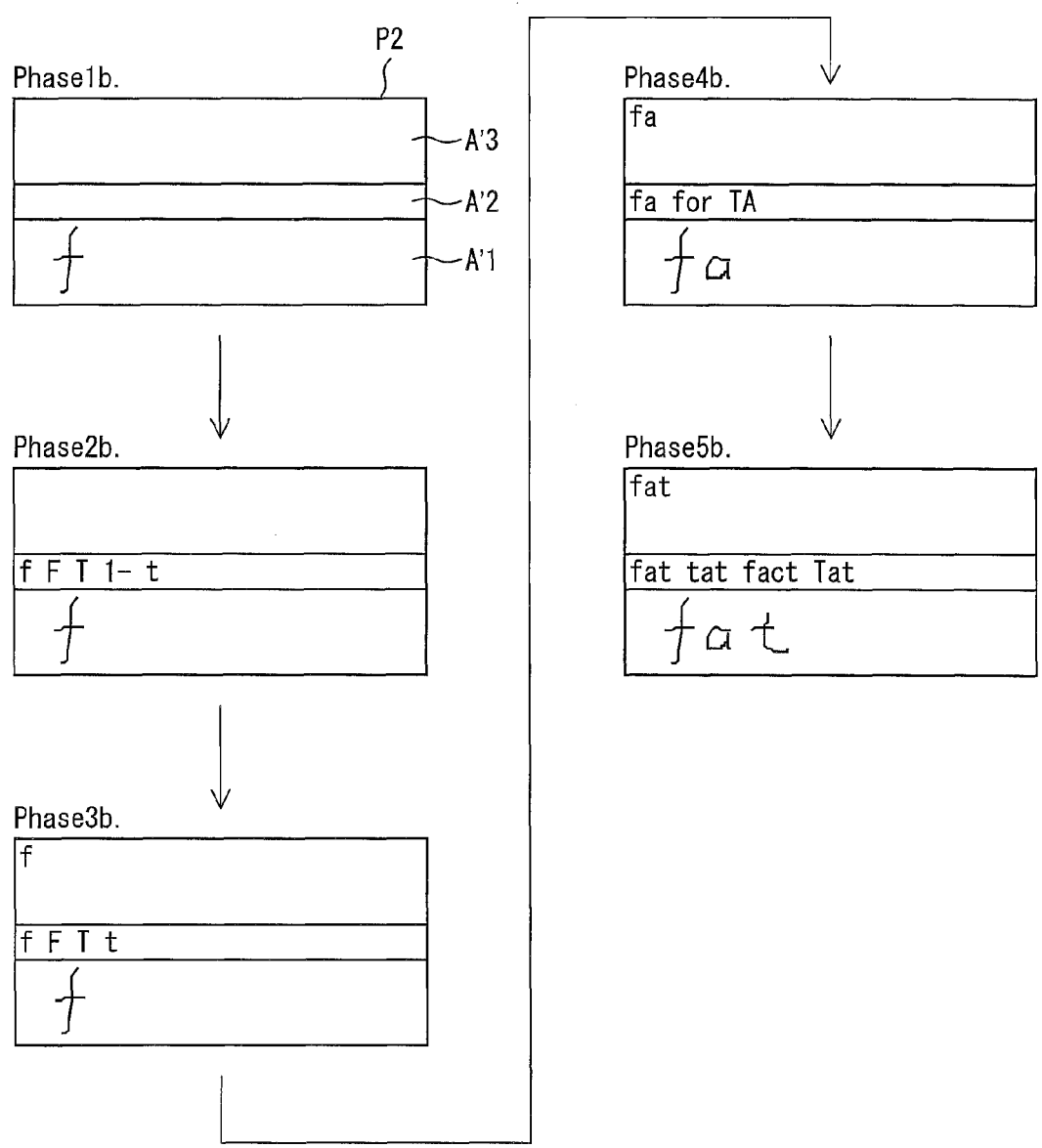
FIG. 13 is an explanatory view 2 for explaining transition of a screen in the display transition process carried out when the first character input screen is displayed on the display section.

FIG. 12 illustrates the display transition in a case where Japanese (hiragana characters) is inputted in the second character input screen. Note, however, that the second character input screen can accept handwriting input of other languages. FIG. 13 illustrates a display transition in a case where alphabetic characters (English) are inputted. Note that the display transition in this case is similar to that of the case where Japanese is inputted, and is therefore simply described below.

First, when the user has inputted a handwritten character "f?" in the handwriting input area A'1, the inputted character candidate display section 1213 recognizes the handwritten character ("f?") thus inputted (S203A; see Phase 1b in FIG. 13). Next, the inputted character candidate display section 1213 prepares inputted character candidates ("f", "F", "1-t", etc.) from a result of the character recognition, and causes the inputted character candidates to be displayed in the inputted character candidate display area A'2 (S204A; see Phase 2b in FIG. 13). Then, the sentence editing area display section 1216 causes the inputted character candidate "f", which has been selected from the inputted character candidates displayed in the inputted character candidate display area A'2, to be displayed in the sentence editing area A'3 (S205A; see Phase 3b in FIG. 13). Phases 4b and 5b of FIG. 13 illustrate respective screens in which handwritten characters "a?" and "t?" are inputted in this order and then the areas A'1 through A'3 displayed on each of the screens are updated in procedures similar to the above described procedures.

[Additional Remarks 2]

The sections of the electronic apparatus 1 and the display control device 12 of the present invention can be configured by hardware logic or realized by software with the use of a CPU as follows.

That is, the display control device 12 includes a CPU, a ROM, a RAM, a storage section 13 (storage medium) such as a memory, and the like. The CPU executes instructions of control programs for realizing the functions of the display control device 12. In the ROM, the programs are stored. Into the RAM the programs are loaded. In the storage section 13, the programs and various data are stored.

The objective of the present invention can also be achieved, by (i) supplying a storage medium, in which program codes (executable programs, intermediate code programs, source programs) of control programs, which are software for realizing the functions are stored so that a computer can read them, to the display control device 12, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM (Registered Trademark), or flash ROM.

Alternatively, display control device 12 can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network.

The present invention is not limited to the embodiments, but can be altered by a skilled person in the art within the scope of the claims. An embodiment derived from a proper combination of technical means disclosed in respective different embodiments is also encompassed in the technical scope of the present invention.

As above described, the display control device of the present invention includes:

(1) a sentence editing area display section configured to cause a sentence editing area, in which the user edits a sentence with use of text data, to be displayed on the screen; and (2) a character input screen switching section configured to switch between a first character input screen state and a second character input screen state, the first character input screen state being a state in which the inputted character candidates are displayed by the inputted character candidate display section and a character selected from the inputted character candidates is displayed in the sentence editing area, and the second character input screen state being a state in which the inputted character candidates are displayed by the inputted character candidate display section, the inputted character string candidate is displayed by the inputted character string candidate display section, the converted character string candidates are displayed by the converted character string candidate display section, and a character string selected from the converted character string candidates is displayed in the sentence editing area.

According to the configuration, it is possible to switch between (i) the first character input screen state in which a character selected from inputted character candidates is displayed in the sentence editing area and (ii) the second character input screen state in which, in addition to the inputted character candidates, an inputted character string candidate and converted character string candidates are displayed, and a character string selected from the converted character string candidates is displayed in the sentence editing area.

This makes it possible to switch between the two character input screen states in response to an operation by the user, and it is therefore possible to improve convenience in inputting characters.

According to the display control device of the present invention, it is possible that, in a case where a recognition distance of a candidate of a character that is predicted as an intended character to be inputted by the user is equal to or more than a predetermined level, the character input screen switching section causes an input screen state switching area to be displayed on the screen, the input screen state switching area being used by the user to switch between the first character input screen state and the second character input screen state.

For example, in a case where the user does not accurately remember a letter shape of a certain kanji character and handwrites such a vaguely remembering kanji character, the inputted character candidate display section determines that a recognition distance of the character, which is predicted as an intended character to be inputted by the user, is equal to or more than the predetermined level. Then, the character input screen switching section causes the input screen state switching area to be displayed on the screen for switching the display control device to be in the second character input screen state.

The user switches to the second character input screen state, and inputs a reading for the intended kanji character by handwriting. Then, an inputted character string candidate is predicted from the reading and is displayed, and converted character string candidates obtained by converting the inputted character string candidate are displayed on the screen.

This allows the user to find the intended kanji character from among the converted character string candidates thus displayed.

According to the display control device of the present invention, the character input screen switching section can be configured to cause a message area to be displayed on the screen, the message area notifying that the second character input screen state is a state in which an inputted handwritten character is to be automatically converted.

According to the configuration, the user who has inputted a handwritten character on the second character input screen can be informed by viewing the message area that the handwritten character thus inputted is to be automatically converted. This makes it possible to further improve convenience for the user.

INDUSTRIAL APPLICABILITY

The present invention can be applied to an electronic apparatus that includes a touch panel via which handwritten characters can be inputted through touch.

REFERENCE SIGNS LIST

1: Electronic apparatus
12: Display control device
1212: Character input screen switching section
1213: Inputted character candidate display section
1214: Inputted character string candidate display section
1215: Converted character string candidate display section
1216: Sentence editing area display section

The invention claimed is:

1. A display control device comprising:
an inputted character candidate display section configured to carry out a process of (i) recognizing a handwritten character inputted by a user through touch on a screen and (ii) causing candidates of a character, which is predicted as an intended character to be inputted by the user, to be displayed on the screen as inputted character candidates;
an inputted character string candidate display section configured to carry out a process of causing a candidate of a character string, which is predicted as an intended character string to be inputted by the user, to be displayed on the screen as an inputted character string candidate, with use of a character selected from the inputted character candidates;
a converted character string candidate display section configured to carry out a process of causing converted character string candidates, which have been prepared by converting the inputted character string candidate, to be displayed on the screen;
a sentence editing area display section configured to cause a sentence editing area, in which the user edits a sentence with use of text data, to be displayed on the screen; and
a character input screen switching section configured to switch between a first character input screen state and a second character input screen state,
the first character input screen state being a state in which the inputted character candidates are displayed by the inputted character candidate display section and a character selected from the inputted character candidates is displayed in the sentence editing area, and
the second character input screen state being a state in which the inputted character candidates are displayed by the inputted character candidate display section, the inputted character string candidate is displayed by the inputted character string candidate display section, the converted character string candidates are displayed by the converted character string candidate display section, and a character string selected from the converted character string candidates is displayed in the sentence editing area; and
in a case where a recognition distance of a candidate of a character that is predicted as an intended character to be inputted by the user is equal to or more than a predetermined level, the character input screen switching section causes an input screen state switching area to be displayed on the screen, the input screen state switching area being used by the user to switch between the first character input screen state and the second character input screen state.

2. The display control device as set forth in claim 1, wherein:
the character input screen switching section causes a message area to be displayed on the screen, the message area notifying that the second character input screen state is a state in which an inputted handwritten character is to be automatically converted.

3. An electronic apparatus comprising a display control device recited in claim 1.

4. A method for controlling a display device, said method comprising the steps of:
recognizing a handwritten character inputted by a user through touch on a screen of the display device and causing candidates of a character, which is predicted as an intended character to be inputted by the user, to be displayed on the screen as inputted character candidates;
causing a candidate of a character string, which is predicted as an intended character string to be inputted by the user, to be displayed on the screen as an inputted character string candidate, with use of a character selected from the inputted character candidates;
causing converted character string candidates, which have been prepared by converting the inputted character string candidate, to be displayed on the screen;
a sentence editing area display section configured to cause a sentence editing area, in which the user edits a sentence with use of text data, to be displayed on the screen; and
a character input screen switching section configured to switch between a first character input screen state and a second character input screen state,
the first character input screen state being a state in which the inputted character candidates are displayed by the inputted character candidate display section and a character selected from the inputted character candidates is displayed in the sentence editing area, and
the second character input screen state being a state in which the inputted character candidates are displayed by the inputted character candidate display section, the inputted character string candidate is displayed by the inputted character string candidate display section, the converted character string candidates are displayed by the converted character string candidate display section, and a character string selected from the converted character string candidates is displayed in the sentence editing area; and
in a case where a recognition distance of a candidate of a character that is predicted as an intended character to be inputted by the user is equal to or more than a predetermined level, the character input screen switching section causes an input screen state switching area to be displayed on the screen, the input screen state switching area being used by the user to switch between the first character input screen state and the second character input screen state.

5. A non-transitory computer-readable recording medium storing thereon the control program for causing a computer to function as the display control device according to claim 1, the control program causing the computer to function as each of the means.

* * * * *